United States Patent [19]
Hedderly et al.

[11] Patent Number: 5,609,063
[45] Date of Patent: Mar. 11, 1997

[54] STEERING COLUMN SUPPORT FOR A COLLAPSIBLE STEERING COLUMN

[75] Inventors: Gregory T. Hedderly, Livonia; Lisa A. Tyus, Belleville; Leonard M. Brown, Farmington Hills, all of Mich.

[73] Assignee: Ford Motor Company, Dearborn, Mich.

[21] Appl. No.: 417,353

[22] Filed: Apr. 5, 1995

[51] Int. Cl.⁶ .................................................. B62D 1/11
[52] U.S. Cl. ............................ 74/492; 280/777; 188/371
[58] Field of Search .............................. 74/492; 280/777, 280/779; 188/371, 376

[56] References Cited

U.S. PATENT DOCUMENTS

| | | | |
|---|---|---|---|
| 3,505,897 | 4/1970 | Scheffler et al. | |
| 3,702,081 | 11/1972 | Arnston | 74/492 |
| 3,815,438 | 6/1974 | Johnson | 74/492 |
| 4,509,386 | 4/1985 | Kimberlin | 74/492 |
| 4,616,522 | 10/1986 | White et al. | 74/492 |
| 4,738,469 | 4/1988 | Ushijima et al. | 280/777 |
| 4,946,195 | 8/1990 | Ioka et al. | 280/777 |
| 4,951,522 | 8/1990 | Chowdhury | 74/492 |
| 5,024,118 | 6/1991 | Khalifa et al. | 74/492 |
| 5,181,435 | 1/1993 | Khalifa et al. | 74/492 |
| 5,228,359 | 7/1993 | Thomas | 74/492 |

Primary Examiner—Charles A. Marmor
Assistant Examiner—Troy Grabow
Attorney, Agent, or Firm—Gregory P. Brown

[57] ABSTRACT

A steering column support (26) for mounting an energy absorbing steering column within a motor vehicle includes a strap (30) that extends transversely with respect to the steering axis A and has a central portion (32) that mounts the steering column as well as having opposite ends (38) each of which include a mounting portion (40) for mounting on the vehicle. The support (26) also includes a guide (52) secured to the vehicle. The guide (52) extends along a predetermined axis and the strap (30) includes a hook (42) disposed adjacent to the guide (52). Collapse of the steering column along the steering axis A deforms the strap to absorb energy while the hook (42) engages the guide (52) to direct the steering column to a predetermined orientation during the collapse of the steering column.

9 Claims, 2 Drawing Sheets

5,609,063

STEERING COLUMN SUPPORT FOR A COLLAPSIBLE STEERING COLUMN

BACKGROUND OF THE INVENTION

1. Field of the Invention

This invention relates to a vehicle energy absorbing steering column having a steering axis about which steering takes place during operation of the vehicle. More specifically, the present invention relates to a steering column support for guiding the orientation of the steering column during collapse under impact.

2. Disclosure Information

Energy absorbing steering columns for vehicles conventionally include a deformable support whose deformation during steering column movement provides the energy absorption. This energy absorption is desirable to dissipate the magnitude of the reaction force generated by the steering column as it resists deformation. One example of an energy absorbing steering column support is shown in U.S. Pat. No. 4,951,522 which is assigned to the assignee of the present invention. This patent discloses a strap that deforms during the collapse of the steering column.

It has been observed that energy absorbing steering columns may rotate about an axis transverse to the steering axis of the motor vehicle. That is, the steering column may rotate such that the steering wheel moves upward in the vehicle, or downward from an initial position. If such rotations are unabated, the overall energy absorption capability of the steering column may be reduced.

It would be desirable to provide a steering column support apparatus that could be inexpensively manufactured and capable of providing both energy absorption and steering column orientation control during collapse.

SUMMARY OF THE INVENTION

According to the present invention, a steering column support apparatus is disclosed for use in a motor vehicle having an energy absorbing collapsible steering column with a steering axis about which steering takes place during operation of the vehicle. The steering column support apparatus includes a guide secured to the vehicle. The guide has a longitudinal axis extending along a predetermined axis. The support also includes a strap that extends transversely with respect to the steering axis and has a central portion for mounting the steering column on the strap. The strap further includes opposite ends each of which has a mounting portion for mounting the support to the vehicle.

The strap further includes a hook extending from the central portion to an open end adjacent to the guide. The open end of the hook is adapted to engage the guide. Together, the guide and hook cooperate to direct the collapse of the steering column along the predetermined axis of the guide. The collapse of the steering column deforms the strap, thereby absorbing energy while the hook engages the guide to direct the steering column through a predetermined orientation during collapse.

An advantage of the present invention is to provide an improved energy absorbing steering column support that permits increased stroke during steering column collapse while maintaining a predetermined orientation of the steering column as it collapses.

DETAILED DESCRIPTION OF THE PREFERRED EMBODIMENTS

Figure 1:
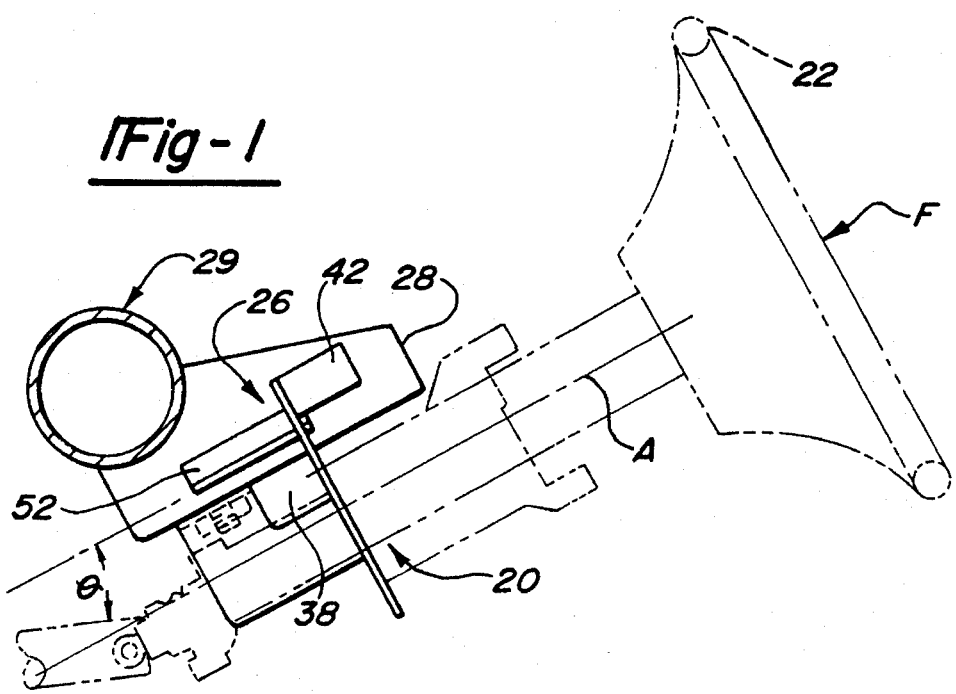
FIG. 1 is an elevational view of an energy absorbing steering column in a motor vehicle having a steering column support according to the present invention.
Figure 2:
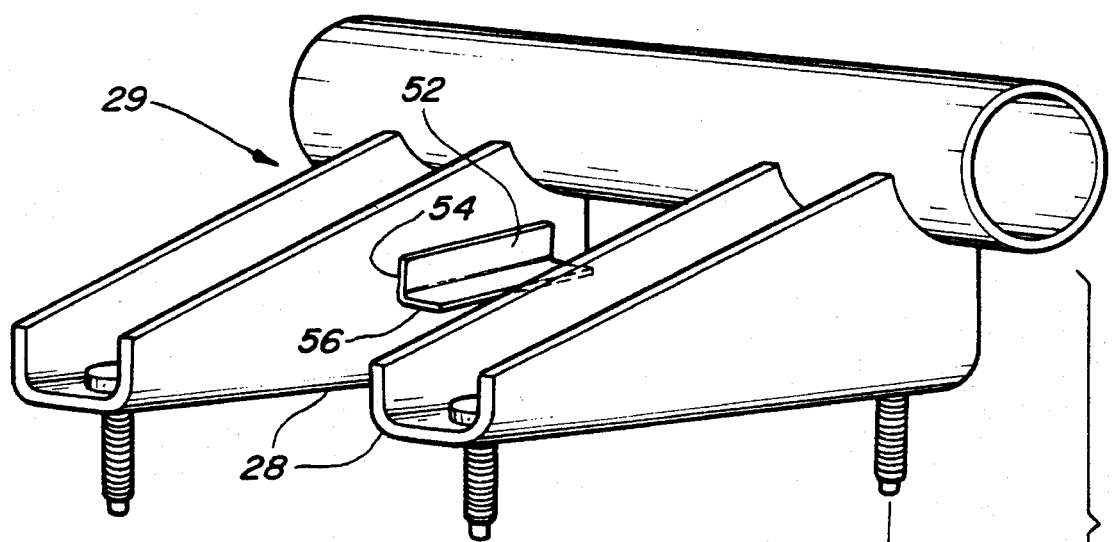
FIG. 2 is an exploded perspective view of a steering column support and the instrument panel support structure according to the present invention.
Figure 2:
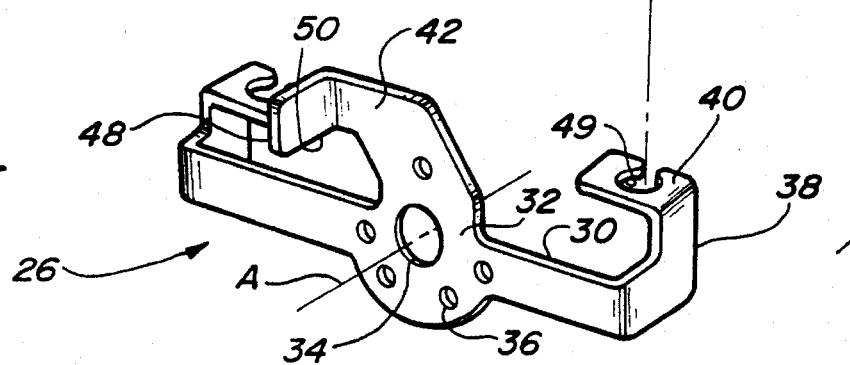

As illustrated in FIGS. 1 and 2, an energy absorbing steering column 20 for a vehicle has a steering axis A about which steering takes place during operation of an associated vehicle by manipulation of a steering wheel 22. An energy absorbing steering column support 26 is located along the steering axis A adjacent the steering wheel 22 to provide mounting thereof on the vehicle such as on the pair of spaced vehicle members 28 within the cross car instrument panel structure 29 illustrated.

Figure 3:
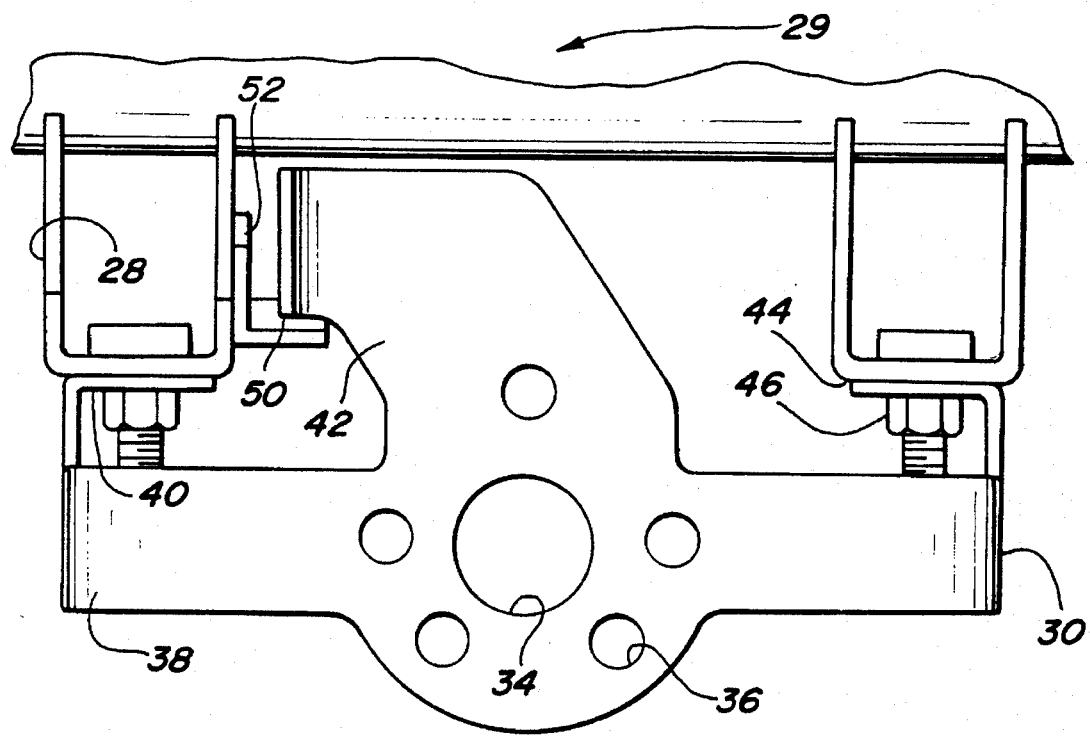
FIG. 3 is axial view illustrating a steering column support and instrument panel support structure assembly according to the present invention.

As illustrated in FIGS. 2 and 3, the support 26 includes a strap 30 that extends transversely with respect to the steering axis A and has a unitary construction. This strap 30 has a central portion 32 against which a portion of the steering column 20 seats with the central steering portion of the steering column extending through a keyhole shaped opening 34. The steering column 20 is secured to the support 26 by fasteners (not shown) that extend through fastener openings 36 in the central support portion 32. On opposite sides of this central portion 32, the strap has opposite ends 38 each of which includes a mounting portion 40 for mounting on the vehicle such as to the vehicle members 28.

The strap 30 also includes a hook 42 radially extending from the central portion 32. The hook 42 extends outwardly to an open end 48 having a bearing surface 50 at a predetermined point related to the proximity of the vehicle members 28. In the preferred embodiment, the open end 48 bends substantially perpendicular to the strap 30. The open end 48 extends along an axis substantially parallel to steering axis A thereby forming a larger, longitudinal bearing surface The support 26 also includes a longitudinal guide 52 secured to one of the vehicle members 28 having a longitudinal axis aligned in a predetermined angular orientation, indicated by θ, as shown in FIG. 1. Generally, θ ranges between plus and minus thirty degrees from the steering axis A. It may also provide an arcuate path. In the preferred embodiment, the guide 52 includes first and second portions 54, 56 forming substantially a right angle therebetween. The first portion 54 is secured to the vehicle member 28 in a predetermined orientation. Securement may be by weldment, rivet, threaded fastener or any other known technique capable of sustaining the anticipated shear loads. The second portion 56 is adapted to receive the bearing surface 50 on the hook 42. The second portion may be flat, or channeled to matingly engage the open end 48 of the hook 42 to maintain engagement in the event of side loading on the steering column 20. Additionally, the second portion 56 cooperates with the larger, longitudinal bearing surface 50 of the preferred embodiment to provide additional orienting stability against rotations of the column about an axis transverse to the steering axis A.

As also illustrated in FIGS. 2 and 3, the opposite ends of the strap 30 preferably have clamping connections 44 that mount the mounting portions 40 on the vehicle. This permits pivoting of the mounting portions against the clamping force which cooperates with the deformation of the strap 30 to increase the steering column stroke and energy absorption. The clamping connections 44 most preferably include threaded fasteners 46 provided by nut and bolt securement along with an associated washer. More specifically, each mounting portion 40 has a generally flat shape that extends perpendicular to the associated strap end 38 and is disclosed as including an elongated slot 49 through which the associated clamping connection 44 extends so as to provide clamping of the mounting portion 40 against the associated vehicle member 28.

The strap 30 and the guide 52 may be constructed from a variety of metals. In the preferred embodiment costs and manufacturing complexity is minimized by stamping the guide 52 and the strap 42 from cold rolled steel. HSLA steel may be used for the strap where increased energy dissipation is desirable. In the preferred embodiment, both the energy dissipation strap and the hook can be stamped from a common blank in a single stamping operation. It should be recognized that significant material and tooling costs can be saved through the use of this preferred embodiment. This does not limit the variety of materials that would function equivalently. For instance, the guide 52 and hook 42 could be constructed from plastics and composites as well as other metals such as aluminum.

Figure 4:
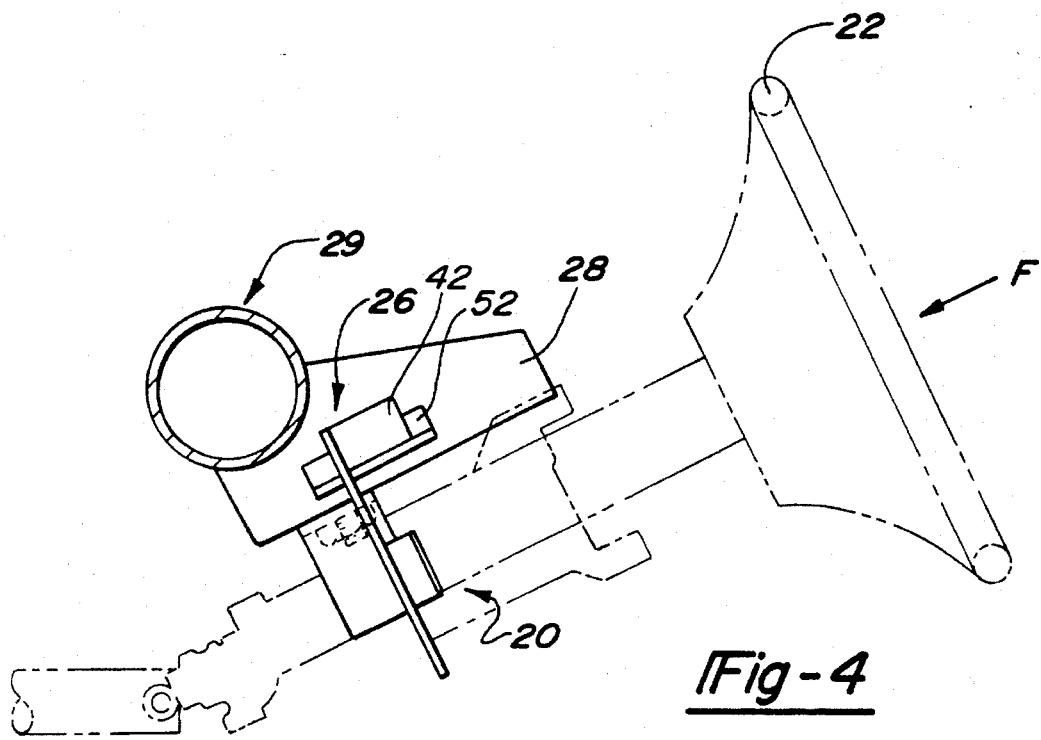
FIG. 4 is a side view illustrating a hook and guide directing a steering column into a predetermined orientation during collapse of the steering column in accord with the principles of the present invention.

Operation of the present invention will now be discussed with reference to FIGS. 1 and 4. During the initial column movement, force, F, applied to the steering wheel 22, such as during a vehicle impact, pushes downwardly and forwardly against the support 26 at its central portion 30. This force causes the collapsible column to collapse from an initial position shown in FIG. 1 to a collapsed position shown in FIG. 2. As this occurs, the column absorbs energy to gradually dissipate the force. The construction of the support 26 permits an increased stroke as compared to prior art steering columns supports of this type. Additionally, the hook 42 directs the collapse of the column along a predetermined axis parallel to the longitudinal axis of the guide 52, shown by angle θ. This allows the steering wheel 22 to be directed to a predetermined orientation. As such, movement of the steering column along the steering axis A deforms the strap to absorb energy by bending portions of the strap between the opposite ends 38 and the central portion 32. This portion of the strap 30 may include U-shaped segments to provide additional stroke and deformation for increased energy management.

The foregoing description presents one embodiment of the present invention. Details of construction have been shown and described for purposes of illustration rather than limitation. Modifications and alterations of the invention will no doubt occur to those skilled in the art that will come within the scope and spirit of the following claims.

What is claimed:

1. A steering column support apparatus for use in a motor vehicle with an energy absorbing steering column having a steering axis about which steering takes place during operation of the vehicle, said support apparatus comprising:

a guide secured to said vehicle, said guide having a longitudinal axis extending along a predetermined axis;

a strap that extends transversely with respect to the steering axis and has a central portion that mounts the steering column on the strap;

said strap having opposite ends each of which include a mounting portion for mounting on the vehicle; and said strap further including a hook extending from said central portion to an open end adjacent to said guide, said open end being adapted to engage said guide, whereby collapse of the steering column along the steering axis deforms the strap to absorb energy and said hook engages said guide, thereby directing the steering column to collapse in a predetermined orientation.

2. A steering column support apparatus according to claim 1, wherein said guide includes first and second portions forming a substantially right angle therebetween, said first portion being secured to the vehicle to support said second portion, said second portion being adapted to slidably engage said open end of said hook.

3. A steering column support apparatus according to claim 2, wherein said open end of said hook includes longitudinal bearing surface oriented substantially parallel to said longitudinal axis of said guide, thereby directing the steering column into a preferred orientation during the collapse of the steering column.

4. A steering column support apparatus according to claim 1, wherein said hook extends radially outward from said central portion to a predetermined position where said hook bends substantially perpendicular from said central portion forming an open end having a longitudinal bearing surface for engaging said guide.

5. A steering column support apparatus for use in a motor vehicle with an energy absorbing steering column having a steering axis about which steering takes place during operation of the vehicle, said support apparatus comprising:

an instrument panel support structure that extends transversely with respect to the steering axis;

a guide secured to said instrument panel support structure, said guide having a longitudinal axis extending along a predetermined axis substantially parallel to the steering axis;

a strap that extends transversely with respect to the steering axis and has a central portion that mounts the steering column on the strap;

said strap having opposite ends each of which include a mounting portion for mounting to said instrument panel support structure; and said strap further including a hook extending from said central portion to an open end adjacent to said guide, said open end opening in the same direction as said guide, whereby movement of the steering column along the steering axis deforms the strap to absorb energy and said hook engages said guide to direct the steering column to a predetermined orientation during the collapse of the steering column.

6. A steering column support apparatus according to claim 5, wherein said guide includes first and second portions forming a substantially right angle, said first portion being secured to the vehicle to support said second portion, said second portion being adapted to slidably engage said open end of said hook.

7. A steering column support apparatus according to claim 6, wherein said open end of said hook includes longitudinal bearing surface oriented substantially parallel to said longitudinal axis of said guide, thereby directing the steering column into a preferred orientation during the collapse of the steering column.

8. A steering column support apparatus according to claim 5, wherein said hook extends radially outward from said central portion to a predetermined position where said hook bends substantially perpendicular to said central portion forming an open end having a longitudinal bearing surface thereon for engaging said guide.

9. A steering column support apparatus for use in a motor vehicle with an energy absorbing steering column having a steering axis about which steering takes place during operation of the vehicle, said support apparatus comprising:

an instrument panel support structure that extends transversely with respect to the steering axis;

a guide having first and second portions substantially forming a right angle, said first portion being secured to said instrument panel support structure to support said second portion, said second portion having a longitudinal axis extending along a predetermined axis substantially parallel to the steering axis;

a strap that extends transversely with respect to the steering axis and has a central portion that mounts the steering column on the strap;

said strap having opposite ends each of which include a mounting portion for mounting on to said instrument panel support structure; and said strap further including hook extending radially outward from said central portion to a predetermined position where said hook bends substantially perpendicular from said central portion, thereby forming an open end having a longitudinal bearing surface thereon for engaging said second portion of said guide, said hook and guide cooperating to direct the steering column to collapse in a predetermined orientation as the strap deforms to absorb energy.

* * * * *